Oct. 17, 1950     G. L. RINGLAND     2,526,047
TOTALLY ENCLOSED DYNAMOELECTRIC MACHINE
Filed June 28, 1949
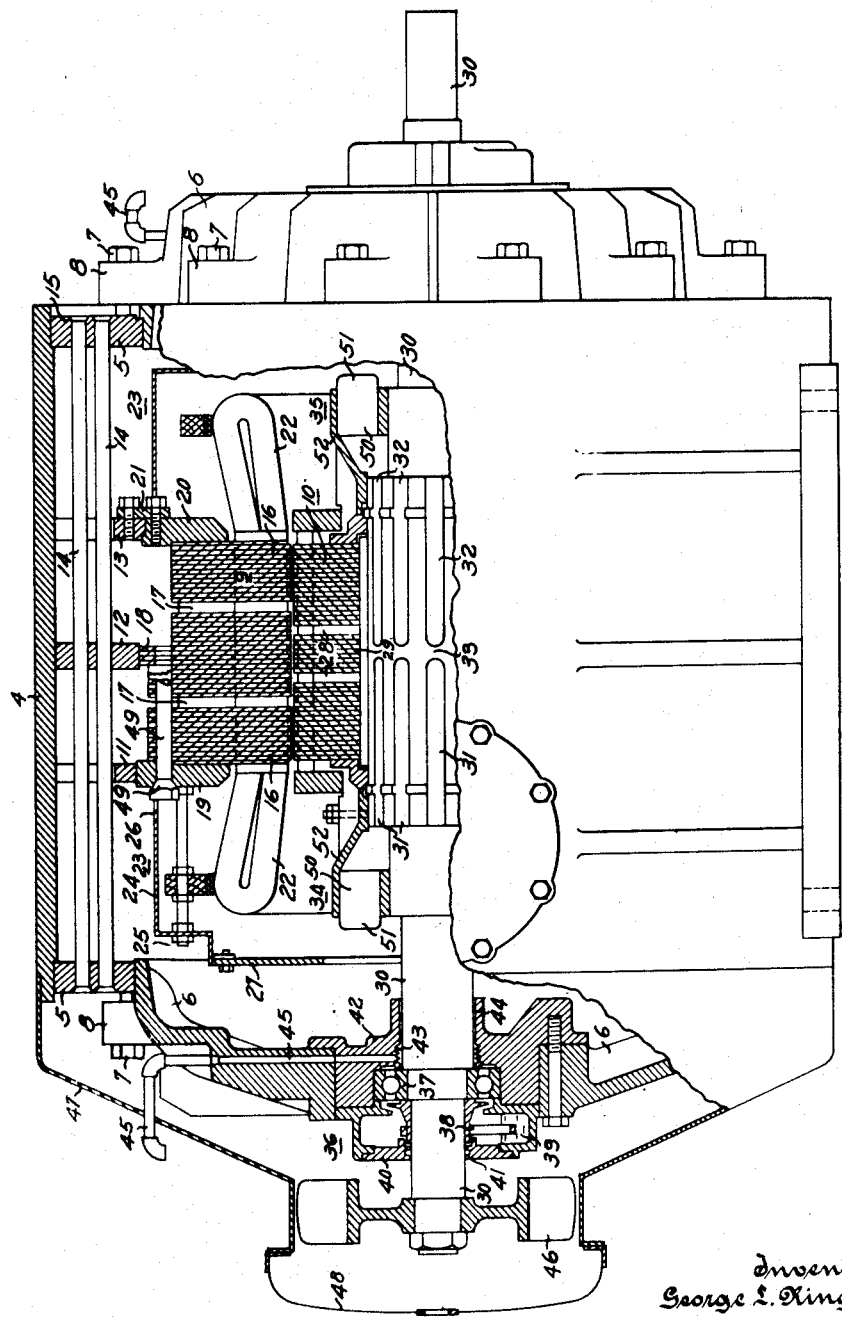
Inventor
George L. Ringland
by T. Floyd LaFave
Attorney Patented Oct. 17, 1950

2,526,047

UNITED STATES PATENT OFFICE 2,526,047

TOTALLY ENCLOSED DYNAMOELECTRIC MACHINE

George L. Ringland, Norwood, Ohio, assignor to Allis-Chalmers Manufacturing Company, Milwaukee, Wis., a corporation of Delaware Application June 28, 1949, Serial No. 101,822

5 Claims. (Cl. 171—252)

This invention relates in general to dynamoelectric machines and refers particularly to a totally enclosed explosionproof motor.

It is an object of this invention to provide an explosionproof motor with an improved ventilating system.

Another object of this invention is to provide a totally enclosed dynamoelectric machine adequately sealed against flame propagation from one end of the machine to the other with an improved ventilating system.

Objects and advantages other than those above set forth will be apparent from the following description when read in connection with the accompanying drawing, which shows a side elevational view, partly in section, of a dynamoelectric machine embodying the present invention.

Referring to the drawing, the totally enclosed dynamoelectric machine of this invention has an outer generally cylindrical housing 4 closed at each end by end rings 5, which are welded to the housing to form an air tight joint, and by end bells 6 secured to the inner peripheries of the end rings 5.

Each end bell 6 has an annularly shaped shoulder portion that contacts the inner annular surface as well as the outer face of end ring 5. The end bell 6 is secured to the end ring 5 by axially disposed bolts 7 extending through lugs 8 which radially project from the end bell. In case of explosions within the machine, radial stresses produced on the end bell are radially transferred through the shoulder portion to the ring 5 so that little or no shear stress is transferred to the bolts 7.

A stator core 9 is supported in the yoke forming the housing 4, and a rotor 10 disposed in the stator core defines therewith an air gap of narrow width so as to arrest the propagation of a flame tending to travel through the air gap. The stator core is supported by rings 11, 12, 13 secured to the housing by welding. Blocking means comprising central ring 12 cooperate with central portions of the stator and rotor to transversely divide the space within the machine into two parts medially of the rotor, stator, and housing to prevent flames from passing between ends of the housing, so that ignition of the explosive gases in either half of the machine is confined thereto.

Outer rings 11 and 13 are scalloped or notched at the outer periphery thereof to provide for axial passage of air adjacent the housing.

In order to cool the air inside the housing, a plurality of cooling tubes 14 are provided in the annular space between the housing and the stator core. The tubes 14 are mounted longitudinally through end rings 5, and stator support rings 11, 12 and 13.

The tubes 14 are expanded in chamfered holes 15 of rings 5 and the ends flared therein; thus securing the tubes and sealing the tube receiving holes.

The stator core is built up of laminations in spaced groups to form radial air ducts 17. The laminations 16 are eared to provide means for securing in the core without using an excess of core material. However, the central group of laminations 18 are circular and extend radially beyond the eared portion of the other laminations. This central group of circular laminations 18 are disposed in ring 12 to cooperate therewith in forming the blocking means between the ends of the housing. The stator laminations are secured between stator end rings 19, 20 by through bolts 49.

Stator end ring 20 is disposed in ring 13, and the two rings have corresponding L-shaped shoulders abutting each other. Retaining links 21 secured by screws to both rings 13 and 20, cooperate with the abutting shoulders of these rings to prevent axial and rotational movement of the stator core. The inside diameters of rings 11, 12, 13 are stepped in size from one end of the core to the other, and the outside diameters of the core members supported therein are likewise stepped. Therefore, the outer periphery of ring 20 has a diameter somewhat less than the inside diameters of central ring 12, outer ring 11 and end ring 5. Similarly, the outside diameter of the central group of laminations 18 is somewhat smaller than the inside diameter of stator support ring 11. The outside diameter of end ring 19 is smaller than the inside diameter of end ring 5. Therefore, insertion of the stator core 9 in the supporting housing is facilitated since the leading stator members sufficiently clear the leading stator support rings, and removal of the stator core is likewise facilitated. Suitable windings 22 are disposed in slots in the stator core in the usual manner.

The space between the stator, the end bell and the housing, at each end of the machine, may be divided by a shield 23 comprising a cylindrical member 24 secured to a stator ring 19 or 20 and further supported by bolts 25, which also support the end turns of the stator windings 22. Cylindrical member 24 may be notched or scalloped adjacent the stator end ring to provide passages 26 for radial flow of air therethrough. The shield 23 also comprises an annular plate 27 removably secured to the cylindrical member 24. The plate 27 is removed when inserting or removing the rotor without necessitating removal of the entire shield.

The rotor 10 is of conventional form comprising a laminated core with radial ventilating passages 28. The group of laminations 29 disposed centrally of the rotor core align with the central laminations 18 of the stator core. The radial ventilating passages 28 of the rotor may align with the stator radial ventilating passages 17 but, as shown, are preferably staggered with respect thereto, so that the air flowing therethrough will flow a short distance along the air gap from a rotor ventilating passage 28 to a stator ventilating passage 17.

The rotor core 10 may be mounted either on a spider or, as shown, directly on a shaft 30 which contains two sets of flutes 31, 32, providing axial ventilating passages connected with the radial ventilating passages 28 of the rotor core. The flutes 31, 32, terminate medially of the rotor core to define blocking means comprising the solid unfluted central portion 33 of the shaft to interrupt the axial ventilating passages medially of the rotor.

Suitable blowers 34, 35 are mounted in a known manner at each end of the rotor for circulating the air inside the housing. Each blower comprises a plurality of blades 50 and an annular shroud 52 for guiding the air forced by the revolving blades axially into the flutes of the shaft. The blades have tip portions 51 extending beyond the edge of the shroud for forcing some air radially over the end turns of windings 22 which are partially enclosed by the shield 23. The rotor shaft 30 is revolubly supported in, and extends out through a bearing 35 secured in an end bell 6 at each end of the housing.

Each bearing 36 may be of any suitable known type such as the ball type bearing shown. The inner portion 37 of the bearing raceway is attached to the shaft 30, and rotating therewith centrifugally forces oil into the raceway from an oil ring 38 supplied with oil from a well 39 which is enclosed by an annular member 40 supported by the end bell. This member 40 has an inner surface forming labyrinth passages 41 surrounding the shaft. Likewise, about the shaft on the other side of the bearing another annular member 42 forms labyrinth passages 43. Member 42 has a smooth bored portion 44 which extends like a sleeve axially along the shaft to form an extended cooling surface for arresting the propagation of any flame tending to pass therebetween due to ignition of gases within the motor. A vent pipe 45 opens to labyrinth passages 43, between the bearing proper and the flame arrestor 44, is secured upright in the end bell 6 and opens to the outside of the housing to release the gas pressure that may be built up between the labyrinth passages by an outer fan 46, which pressure would tend to blow oil out of the bearing into the motor.

Fan 46 is mounted on one end of the shaft 30 in an end head 47 extending from the main housing 4 for enclosing the fan. This end head 47 is open adjacent the fan 46 to admit air thereto through a suitable screen or filter 48. Outer fan 46 forces air through the cooling tubes from one end of the machine to the other.

During operation of the motor, the air enclosed in the half of the machine including internal blower 34, is forced by the blower to circulate through the rotor and stator cores and over the tubes 14. The air is forced through the flutes 31 up to the unfluted portion 33 of the shaft, then outward through a radial rotor ventilating passage 28, then along the air gap to a stator ventilating passage 17, radially outward through passage 17 and over the cooling tubes 14, then axially along the tubes and over the baffle formed by the scalloped ring 11 to the end of the housing, finally between the shield 23 and the end bell 6 to the blower 34. Air entering blower 34 is also forced by the unshrouded tip portions 51 of the blades 50 to flow over the end turns of windings 22, through passages 26 in the shield 23, and into the annular space between the shield and the housing. The other internal blower 35 forces the air in the other half of the machine to circulate in a similar manner. The air within the housing is cooled in passing radially and longitudinally about the cooling tubes 14.

Although but one embodiment of the present invention has been illustrated and described, it will be apparent to one skilled in the art that various changes and modifications may be made therein without departing from the spirit of the invention or from the scope of the appended claims.

It is claimed and desired to secure by Letters Patent:

1. A totally enclosed dynamoelectric machine having a generally cylindrical housing, an end ring at each end of the housing, a plurality of tubes extending longitudinally between and through said end rings for the flow of a cooling medium through said tubes, a laminated stator member secured in said housing and having a plurality of radial ventilating passages, a ring member through which said tubes pass positioned between said housing and said core and medially thereof for blocking passage of air from one end of said housing to the other end thereof, a rotor having a laminated core revoluble in said stator core, said rotor having a plurality of radial ventilating passages staggered axially of said stator core radial ventilating passages, said rotor having axial ventilating passages connecting with said radial ventilating passages, means interrupting said axial ventilating passages medially of said rotor, and blower means revoluble with said rotor for effecting circulation of the air axially through said rotor, radially through said cores and around said tubes and axially back to one of said ends of said housing.

2. A totally enclosed dynamoelectric machine having a generally cylindrical housing, an end ring at each end of the housing, a plurality of tubes extending longitudinally between and through said end rings for the flow of a cooling medium through said tubes, a laminated stator member secured in said housing having a plurality of radial ventilating passages, a ring member through which said tubes pass positioned between said housing and said core medially thereof for blocking passage of air from one end of said housing to the the other end thereof, an end bell mounted on each said end ring, bearings supported on said end bells, a rotor having a laminated core and a shaft extending at both ends thereof supported in said bearings supplied with oil, flame arrestors supported on said end bells and extending longitudinally inward about said shaft, a fan mounted on one end of said shaft on the outer side of one of said end bells, an apertured end head mounted on said housing enclosing said one of said end bells and said fan for forcing said cooling medium through said tubes, means defining an inner labyrinth passage in said bearing along said shaft adjacent said arrestor, a bypass vent extending from said labyrinth passage to the outside of said machine to release pressure in said bearing caused by said fan tending to blow oil into said machine, said rotor having radial ventilating passages staggered axially of said stator core passages, said stator and said rotor defining an air gap of such narrow width as to arrest the propagation of a flame from one end of said housing to the other end thereof, said rotor having axial ventilating passages connected to said radial rotor ventilating passages, means interrupting said axial ventilating passages medially of said rotor, a pair of blowers mounted on said shaft, each said blower being disposed at one end of said rotor for effecting circulation of the air from one of the ends of said housing axially in said rotor from one of the ends thereof, radially through said cores, radially around said tubes, and axially back to said one of said ends of said housing.

3. A totally enclosed dynamoelectric machine having a generally cylindrical housing, an end ring at each end of the housing, a plurality of tubes extending longitudinally between and through said end rings for the flow of a cooling medium through said tubes, a rotor, a laminated stator core having a plurality of radial ventilating passages, means for forcing the air enclosed in said motor to flow radially through said rotor, said stator and over said cooling tubes for ventilating said motor, said stator having members comprising end rings and a group of circular laminations disposed medially of said core, a plurality of rings through which said tubes pass secured to said housing for supporting said stator core, said core members positioned in said stator support rings, one of said stator support rings cooperating with said group of circular laminations for blocking passage of air from one end of said housing to the other end thereof, the other said stator support rings having discontinuous outer peripheral portions adjacent said housing to provide axial passages for the air circulating through said core, the inside diameters of said stator support rings being stepped in size from one end of said core to the other, said core members having outside diameters corresponding to said inside diameters of said stator support rings so there is clearance between the leading said members and stator support rings during insertion of said core in said housing.

4. A totally enclosed dynamoelectric machine having a generally cylindrical housing, an end ring at each end of the housing, a plurality of tubes extending longitudinally between and through said end rings for the flow of a cooling medium through said tubes, a rotor, a laminated stator core having a plurality of radial ventilating passages, means for forcing the air enclosed in said motor to flow radially through said rotor and said stator and over said cooling tubes for ventilating said motor, said stator having members comprising end rings and a group of circular laminations disposed medially of said core, a plurality of rings through which said tubes pass secured to said housing for supporting said stator core, said core members positioned in said stator support rings, one of said stator support rings cooperating with said group of circular laminations for blocking passage of air from one end of said housing to the other end thereof, the other said stator support rings having discontinuous outer peripheral portions adjacent said housing to provide axial passages for the air circulating through said core, the inside diameters of said stator support rings being stepped in size from one end of said core to the other, said core members having outside diameters corresponding to said inside diameters of said stator support rings so there is clearance between the leading said members and stator support rings during insertion of said core in said housing, the leading said stator end ring and the corresponding said stator support ring having L-shaped shoulders abutting one another, and retaining links mounted on said leading stator end ring and the corresponding said stator support ring to hold said shoulders in abutment for preventing axial and circumferential movement of said stator in said housing.

5. A totally enclosed dynamoelectric machine having a generally cylindrical housing, an end ring at each end of the housing, a plurality of tubes extending longitudinally between and through said end rings for the flow of a cooling medium through said tubes, a laminated stator member secured in said housing and having a plurality of radial ventilating passages, a ring member through which said tubes pass positioned between said housing and said core and medially thereof for blocking passage of air from one end of said housing to the other end thereof, said stator comprising windings secured therein having end turns and an apertured shield between said end turns and said housing, a rotor having a laminated core revoluble in said stator core, said rotor having a plurality of radial ventilating passages staggered axially of said stator core radial ventilating passages, said rotor having axial ventilating passages connecting with said radial ventilating passages, means interrupting said axial ventilating passages medially of said rotor, and blower means revoluble with said rotor for effecting circulation of air in a path radially over said end turns, through said shield and into said housing, and in another path axially through said rotor, radially through said cores and around said tubes and axially back to one of said ends of said housing.

GEORGE L. RINGLAND.

REFERENCES CITED

The following references are of record in the file of this patent:

UNITED STATES PATENTS

| Number | Name | Date |
| --- | --- | --- |
| 1,906,849 | Fleischman | May 2, 1933 |
| 2,324,297 | Grobel | July 13, 1943 |
| 2,413,525 | Smith | Dec. 31, 1946 |